United States Patent
Menhardt et al.

(10) Patent No.: US 7,237,199 B1
(45) Date of Patent: Jun. 26, 2007

(54) ARCHITECTURE FOR AN APPLICATION FRAMEWORK

(75) Inventors: Wido Menhardt, Los Gatos, CA (US); Patrick Heffernan, Santa Clara, CA (US)

(73) Assignee: Cedara Software Corp., Mississauga, Ontario (CA)

( * ) Notice: Subject to any disclaimer, the term of this patent is extended or adjusted under 35 U.S.C. 154(b) by 814 days.

(21) Appl. No.: 09/580,163

(22) Filed: May 30, 2000

Related U.S. Application Data

(63) Continuation of application No. PCT/CA98/01099, filed on Dec. 1, 1998, which is a continuation-in-part of application No. 08/982,280, filed on Dec. 1, 1997, now abandoned.

(51) Int. Cl.
*G06F 3/00* (2006.01)
*G06F 15/16* (2006.01)

(52) U.S. Cl. .................. 715/736; 715/853; 715/854; 709/217

(58) Field of Classification Search ........ 345/735–737, 345/771–773, 853, 854; 715/735–737, 771, 715/853, 854; 709/217, 219; 707/10
See application file for complete search history.

(56) References Cited

U.S. PATENT DOCUMENTS

| | | | |
|---|---|---|---|
| 4,943,932 A | 7/1990 | Lark et al. | |
| 5,212,771 A | 5/1993 | Gane et al. | |
| 5,301,320 A | 4/1994 | McAtee et al. | |
| 5,446,842 A | 8/1995 | Schaeffer et al. | |
| 5,544,302 A | 8/1996 | Nguyen et al. | |
| 5,668,998 A | 9/1997 | Mason et al. | |
| 5,717,877 A * | 2/1998 | Orton et al. | 715/860 |
| 5,754,830 A | 5/1998 | Butts et al. | |
| 5,977,972 A * | 11/1999 | Bates et al. | 345/853 |
| 6,144,962 A * | 11/2000 | Weinberg et al. | 345/749 |
| 6,220,743 B1 * | 4/2001 | Campestre et al. | 707/10 |
| 6,246,783 B1 * | 6/2001 | Avinash | 708/322 |
| 6,330,572 B1 * | 12/2001 | Sitka | 707/205 |
| 6,606,740 B1 * | 8/2003 | Lynn et al. | 717/100 |

FOREIGN PATENT DOCUMENTS

WO  WO 97/35254  9/1997

* cited by examiner

*Primary Examiner*—Weilun Lo
*Assistant Examiner*—Truc T. Chuong
(74) *Attorney, Agent, or Firm*—Locke Liddell & Sapp LLP

(57) ABSTRACT

The present invention discloses a framework for monitoring workflow within an application having multiple levels of functionality, the framework being capable of combining a plurality of components from different sources and comprising a process level for selecting a set of defined process steps to be applied to a data set associated with a set of activities, a sub-process level including an aggregation of selected activities from the set of activities and facilitating navigation between the selected activities, and an activity level wherein an activity's property in the data set is modified as a result of the applied processing of the activity level to produce an output data set.

44 Claims, 12 Drawing Sheets

ARCHITECTURE FOR AN APPLICATION FRAMEWORK

This application in a continuation of PCT patent application No. PCT/CA98/01099, filed on Dec. 1, 1998, which is a continuation-in-part of U.S. Ser. No. 08/982,280, filed on Dec. 1, 1997 now abandoned.

BACKGROUND OF THE INVENTION

In an application domain such as in medical care, tasks being performed in a hospital for example, are cross departmental and involve several people, each with a different role. These coordinated activities are typically referred to as "Workflow", with an example being the processing that occurs as a patient moves through the hospital "system". The first step is "admitting", which may be followed by an examination and then detailed lab work and imaging. This is followed by a review of the information with recommendations for further tests, or treatment. There are various tools that operate in this enterprise—wide workflow. For example in the imaging part of this process there are specific software tools that are required for the imaging (scanner consoles), image review and the treatment system. Thus it is desirable that the software tools that operate in this enterprise-wide workflow may be simply integrated.

There is thus a need for a single application framework. This framework should define how components from different sources can be mixed to generate various coherent "applications". This approach does not mean that the framework is a pre-requisite to the use of those components—it is desirable that the individual components can be used outside the framework (e.g., there will be simple applications that do not need the services of the framework, but they should still be able to use some of the components that are generated for this architecture).

It may be noted that in a given "application" may be defined by a main workflow, with sub workflow's within this main application, if one is concerned with both "complex applications", and with applications that span multiple users (i.e., enterprise-wide work-flow). The aim here is to consider only a single "application"—a useful distinction is to consider that there is "workflow" within an application (which is to be supported by the framework), and there is also a "Workflow" at a higher level within, for example, the hospital.

Users in a particular workflow have to use components from different vendors, which have different interfaces or paradigms. Thus the user has to relearn new procedures resulting in errors and inefficiency. In a typical application the user is presented with a selector for data, and then a set of "protocols" or tasks that can be performed on that data. With the closer integration of enterprise-wide work-flow, this model should evolve so that the data and protocol may be specified externally (e.g., in a work-list).

SUMMARY OF THE INVENTION

The present invention thus seeks to provide a framework for an application so that the application is built around a multiple levels of functionality, which may or may not be visible to the user. Three levels of functionality are provided as follows.

The framework also provides functionality for guiding a user through a selected work-flow.

The first is a process—this might also be called a "protocol", as it encapsulates a set of data plus a definition of the processing steps to be applied. An example of a process instance is a study, which is being viewed in a 2D protocol. This level is managed by the framework—and there can be multiple "processes" active at the same time (e.g., the user can be reviewing one study with one process, and at some point switch to reviewing a study from a different patient—the framework manages the different process instances that may be active). In a simple case, a system may hide selection at this level, and present a single process to a user. A process consists of a set of "activities", with the possibility of automated control flow from one activity to the next, based on properties of the activities, and external rules.

Second is a sub-process—although this is listed as the next level in the hierarchy, it is really just a grouping of activities. This aggregation of activities is useful for reuse, convenience of navigation and grouping activities with shared tools.

Generally a process will make activities visible to the end user, which may even need to have the flexibility to switch the order of activities, based not on pre-programmed logic. Thus the sub-process level will present a user interface for navigating between activities, and for indicating the current position in a process.

A third is an activity—this is the lowest level of the hierarchy that is explicitly supported by the framework (an activity can internally present a deeper model, if required). An activity will have external properties, which are altered as the result of any processing, and can then be used to achieve sequencing of activities within a process. It is possible to dynamically (at run time) add or remove activities to a process, so that, for example, a process can provide different functionality based on the results of earlier activities. Each activity is implemented as a separate component.

In addition a "process definition" is the "program", or processing steps that comprise a process. This must be retrieved from persistent storage before a process can be started, so that the activities, tools and control logic can be instantiated for the requested process. A "process instance" refers to a running version of a process—i.e., the process definition plus the data and state information used while it is running. The framework can support multiple process instances—to the user will simply look like different contexts which can be using different data and processing, and which can be switched to be the foreground task.

In order to the framework to support reuse of activities from different sources, it is desirable to define user interface model. Here the approach taken is direct mapping of each of the above levels to a region on the UI, with the addition of support for "tools". The largest part of the UI is assigned for the current activity—this is called the "work area" here. The two levels in the hierarchy ("process selection" and "sub-process navigation") and tools support are assigned 3 separate control areas on the UI. The details of this model are in the following sub-section.

The model explicitly supports a model of "tools" associated with an activity. Support for tools raises the question of what UI mechanisms need to be supported for tools. The simplest model is to assume that there will be single region of the UI, with tools free to use this in any manner. Applications such as the Viewing Wand also require support for additional tools areas—e.g., a second tools area with icon buttons (which in turn have pop-up windows for specific parameter setting). The framework should thus support a more general model where there can be multiple tool areas. However it is suggested that the first implementation stick with the single tools area, but not preclude later support for multiple tools areas (it is expected that this document will be updated to include this).

BRIEF DESCRIPTION OF THE DRAWINGS

A better understanding of the invention will be obtained by reference to the detailed description below in conjunction with the following drawings in which;

FIG. 5(*b*) is a schematic diagram showing support processes for a 2D viewing component;

DETAILED DESCRIPTION OF PREFERRED EMBODIMENTS

Figure 1:
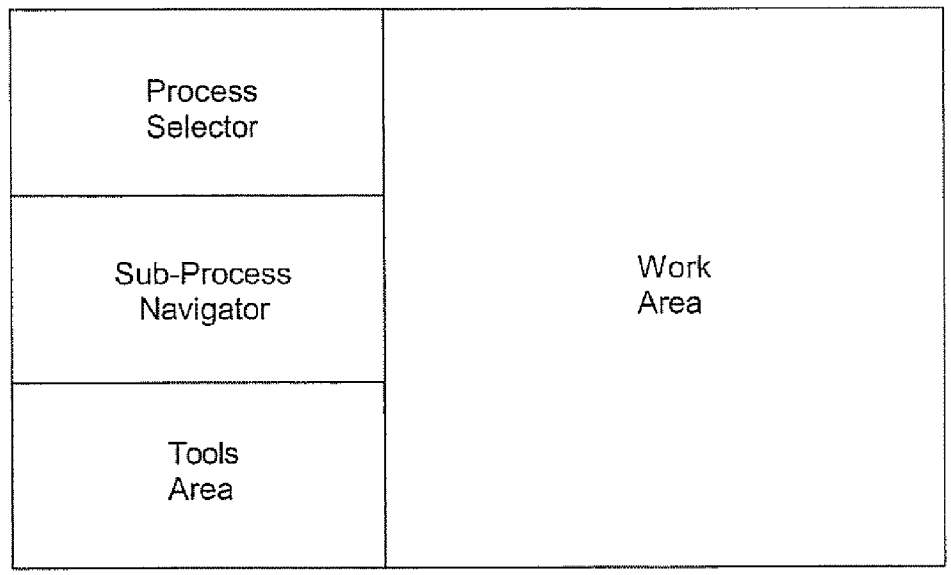
FIG. 1 is a schematic diagram of a user interface (UI)

Referring to FIG. 1 an overview of the default user interface associated with an "application" which uses this framework is shown. The interface defines four areas namely work area, process selector, sub-process navigator and tools area. The default configuration has the work area on the right, with the 3 other regions stacked on the left in a single column This work area is typically used for the display of images, or any secondary user interface that is required by an activity. The current activity owns the work area. The framework arbitrates the ownership of the work area. The contents of the work area may be preserved between activities—description of the contents of the area can be shared using properties stored in the "shared data context".

Although the contents of this area are "arbitrary", it is likely that activities will need to share information about the contents. For example, an activity that allows some manipulation of the displayed images would need to be able to determine the layout of windows in the region, the pipelines used to display within that layout, parameters of the data that is being displayed, etc. This information will be part of the "shared data context".

In the shared tools area, although an activity only "owns" the work area, it can notify the framework that it is interested in the presence of certain tools. Each activity can use some set of tools—and these sets may overlap. The tools area is owned by a tool manager—this is itself a component that acts as a container for the individual tools. The tool manager has a particular UI—e.g., it could display the individual tools using a tab-card model. Since the tool manager is itself a component, it can be replaced by a different manager. Each tool is simply a user interface that displays a UI in the region handed it by the container (e.g., a tab-card). The tool interacts with the activity by setting properties in the interactive context, based on the user actions. The current activity can then use those properties to update its own behavior.

Figure 2:
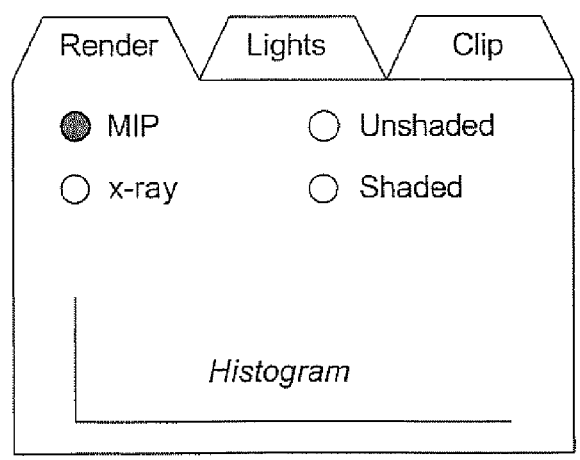
FIG. 2 is a schematic diagram of a tool manager.

FIG. 2 is an example of the tools that might be presented in this area when the current activity is a volume-rendering task. In this example, the tool manager is a tab-card container.

The smallest entity in this model is the "activity". Each activity has ownership of the "work area" when it is active. An activity can also express interest in common tools, which the framework then arranges to place in the "tools" area. These tools provide user input, which is mediated by the framework—e.g., tool output is placed into properties in the interactive context, and the activity is notified of changes to those properties.

The contents of an activity are arbitrary, but one example could be a volume rendering component. This component would indicate an interest in tools like "render selector", "Light control", and "clipping tool"—which the framework would then arrange to have installed into the tools area (as illustrated above). In addition to the common tools, the activity can receive user input from the work area (e.g., window W/L may be changeable via mouse motion). The activity that owns the work area would have the freedom to use mouse events from that area for any purpose, and can of course display any sort of user interface in that area.

Although the activity is free to use the mouse within the work-area for any purpose, it is recommended that the mouse events be reported (as a property in the interactive context). This way the current tool can also use the mouse events (e.g., the W/L tool could use the mouse event to update the current W/L values, which are reported back in the properties in the interactive context).

Figure 3:
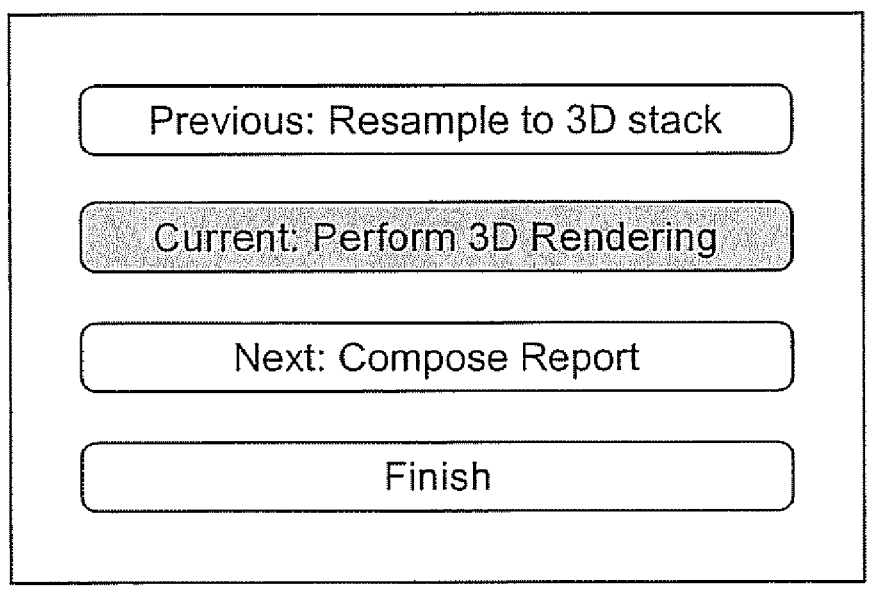
FIG. 3 is a schematic diagram of a sub-process UI.

The sub-process level in the hierarchy is really only here to aid navigation through the activities in the process. This area will also be owned by a component, and thus a different UI model can be achieved by supplying an appropriate component. There are several possible alternate displays for this level:

a) display of the name of the current activity, and next/previous/finish buttons for navigation (perhaps inactive, when the corresponding action is not allowed).

b) a flow view, with activities named, and represented in a network diagram (presumably scrolled, if it is too large to fit into the window). Selection of an activity box switches the current activity to that one (again, some transitions may be disallowed, and this could be indicated by greyed-out representations). FIG. 3 shows an example of a first UI.

Turning back to FIG. 1, the process area is also a component. This area is customizable by supplying an appropriate process selector component. This area will display the following: a button to invoke a data selector (which includes selection of a matching process definition); a mechanism to switch between process instances (if more than one is active); and information about the current data-set (e.g., the patient name)

The data selector will allow browsing of the data sources (e.g., selection from amongst the sources, if there is more than one), and then selection of the patient/study/series, etc. At this time the user will be presented with a selection of the process definitions (basically protocols) that can be invoked with this data.

This example selector is not the only possibility—another model is one where the "data selector" simply displays the work-list (which is obtained from an external work-flow engine), and then the user can select the next item to process. This would include the data-set to use, and the process definition to use.

Another example of a selector is one that uses the opposite model—the user selects a process definition (protocol), and then the candidate data-sets are displayed for selection. An example of this is where the user selects a "cardiac" protocol, and then the data-sets which are suitable for that protocol are shown.

A given process selector might also allow control of the level of information displayed in this area. For example:
  status information only—the display would only show information about the current process (e.g., its type), and the current data-set (e.g., the patient name).
  a user interface for selecting a data set (from a database), and then a list of process definitions that can be used to view that data.
  editable process list. This is the case where the user (perhaps an advanced end-user, or an administrator) needs to assemble new or customized process definitions. The UI in this case might present a list of pre-defined process definitions; and for each defined process, the sub-processes that make it up; and for each sub-process, the activities it includes. The UI would allow the copying, editing, and creating of new process definitions. There would also need to be a mechanism to filter processes (e.g., present a sub-set). Another UI is required to be able to program the logic for the sequencing of activities.

The interface may also be customized. As discussed above, it is likely that a specific application may require that some part of the default user interface not be displayed. Thus the framework should support hiding, and programmability level selection, for the process and sub-process viewers (navigators). The default is to display the process, sub-process and common tool areas at the left side of the screen. The relative sizes of these areas should be configurable. The framework should also allow them to be placed on any of the edges (top, bottom, left and right). Consideration should also be given to allowing these areas to be floating ("dock-able", like the tool areas in Microsoft Visual Studio).

As discussed above, the contents of the 3 areas (process, sub-process and tools) are themselves components, and so the look and functionality of those areas can also be customized in detail by providing alternate versions of those controls.

In order to be completely flexible, the process, sub-process and common tool areas should be capable of being hidden. When run in this mode, the user interface has to be provided externally—the equivalent inputs will have to be provided via run-time binding to the APIs provided by the framework. This mode still uses the framework. It is also possible to use the activities (i.e., those components) without the framework, in which case there is no process instance (and hence no shared data), and the container has to directly provide the appropriate inputs (data-set and input from the user).

The above discussion has made no comment about how the user interface fits into the desktop environment. There will be more than one possible way of achieving this—the UI can be embedded into a web browser like Internet Explorer, or it can be hosted by some other container which handles ActiveX controls. With IE 4.0 and the next Windows and NT releases, this capability extends to the desktop and many of the other tools on the system, so there are a number of choices for the system designer.

The architecture is based on the ActiveX model. This does not mean that it is limited to systems running a Microsoft operating system—ActiveX is supported on NT and Windows95, but it will also soon be supported on the Macintosh and various UNIX versions. Of course the use of the framework on any of these architectures implies that the individual components that are required there also need to be built for that architecture.

The use of the ActiveX model also does not dictate a language for the implementation of the components—any language that is capable of generating ActiveX controls can be used (this currently includes VC++, VB 5.0 and Java).

Although the proceding section discussed the user interface, that break-down also suggests how the underlying components should be structured.

Figure 4:
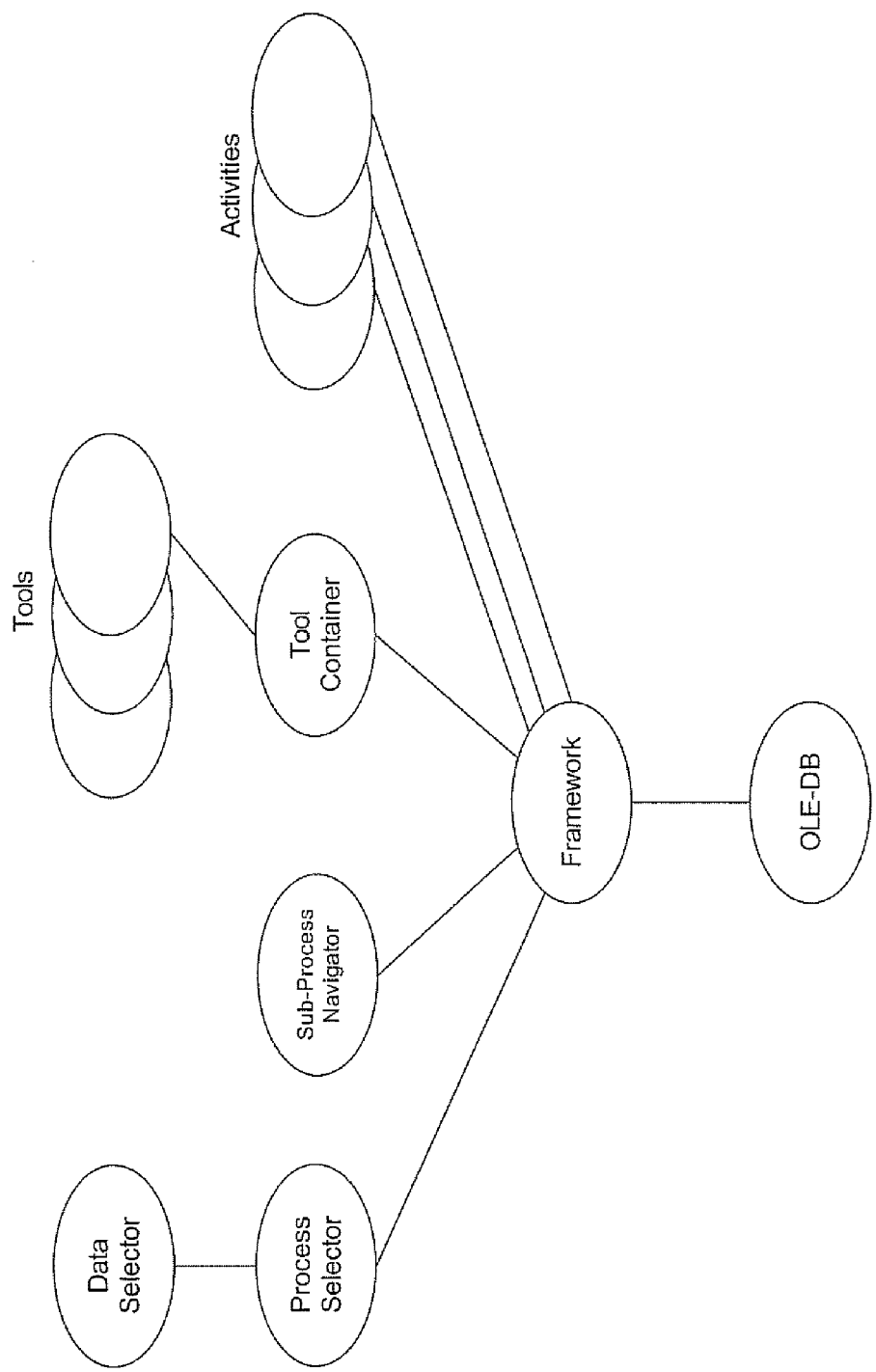
FIG. 4 is a schematic diagram of the system architecture.

Referring to FIG. 4 an overview of the architecture is shown, with the following discussion describing each of the components in more detail.

The framework component is central to the architecture. It serves as a container for the other components, although it is itself an ActiveX component (and so will be hosted in another container). This component encompasses the full UI: work area+process/sub-process/common-tool areas. It has properties that allow customization of the areas (as described with respect to the UI section, above). It includes a module that interfaces to a database (library) of process definitions, sub-process descriptions and the information about the activities. This module will support the process selector/editor (a separate component), and the storing and retrieval of process definitions (sequences of activities and the logic for sequencing between them).

It includes a module that manages the sequencing of activities. This module views a set of properties. Changes to these properties causes the evaluation of some logic which then determines the next action—e.g., move to the next activity, or even change the programmed activities. The activities will interact only with this module for sequencing, but internally it could rely on an external implementation—e.g., use an external work-flow engine. The sub-process navigator will make use of this functionality.

It includes a module that manages the shared data context. This is logically separated from the information required for sequencing (and they might be implemented differently). The information in the current context includes things like the current data-set(s) and also temporary information. Temporary information would include things like the screen layout, the PrS pipelines in use, etc. The framework should not require specific information, nor rely on the presence of particular attributes. However it is important that cooperating activities can share information, so there will be conventions on how data is to be found in the current shared data context. The idea is that the DICOM object model will be adopted, and so activities would locate patient, study, series or image objects in the current shared data context. The framework maintains properties on these objects. By convention, one property will be a pointer to the corresponding record in the database (see OLE-DB section, below). Other candidate properties are the external handles of preserver objects which have loaded data from those objects. These objects in the current shared data context will not themselves maintain information that is stored in the database (unless an activity explicitly adds it as a property)—the expectation is that the activities will go directly to the data source for that information.

The process selector is an ActiveX control. This ActiveX control owns the process area of the UI. Within tis area it displays certain information (as described above in the UI section), and also can invoke a data selector. The particular data selector to be used is configurable.

The data selector is a class of component that allows the user to select a data-set and a process definition to be used.

The UI section above described a couple of different models that can be used for this component.

One example of this class is a component that presents a work-list, allowing the user to select the next one to read. The selection of an item causes the central work-flow engine to be updated to reflect this status (so other users won't simultaneously read the same study). Another example of this class is a more conventional model which allows selection of the data source (e.g., from an OLE-DB enumerator), and then selection of a patient, study, series—with selection of a process definition to match.

Once the data-set and process are selected, the data-set forms the basis of a new shared data context, and the process defines the activities that are to be instantiated and which can then be navigated in the sub-process area.

The Sub-process navigator component is responsible for displaying a UI that can be used to navigate the activities in the current process. It is given a region on the screen (configurable). It uses the services of the framework for actually performing the navigation.

The tool container component manages the set of tools that are active while a specific activity is "current". The tool container provides a means for navigating between those tools—e.g., it may use a tab-cared model.

Activities request the services of classes of tools. Thus there could be a tool that provides "window width and level control". The framework would have a registry of such mappings, and when a specific activity is instantiated, it registers its interest in these classes, which the framework then arranges to have displayed when that activity is current.

The framework supports a process, but any work is actually performed by the activities it contains. Some examples of the types of components that might be developed as activities include:

a component that provides basic 2D viewing of a study in the current shared data context. The functionality would include: layout control, zoom and pan, cine, etc, although the UI for these controls would be provided via tools.
 a component that allows the user to enter a report, perhaps including annotated images. The completion of the report would be indicated by the user, and would in turn signal to the remote work-flow engine that the current work item is completed. This would also trigger the next activity, which in this case may simply be to return to the first activity—selection of a new work item from a displayed work-list.

The life-time of the component that is an activity is controlled by the framework. The framework instantiates an activity when the containing process is started, and destroys it when the process completes. When an activity is created, it is given access to the shared data context. The framework also has an explicit model of the "current" activity—when an activity becomes "current" it can obtain ownership of the work area. An activity can set and get attributes in the shared data context (e.g., properties of the objects there). The activity also can get and set arbitrary attributes in the control area—this set of attributes controls the sequencing of activities.

The mechanism used to notify changes to the current shared data context could be based on the OLE connection model. In any case, the mechanism supports the notification to a component of changes in the context.

The OLE-DB is used as a common standard for accessing all data sources. The data model is based on the DICOM object model. Since the framework will be used to build these applications, then the framework will adopt these same conventions. This means that the data sources will remain external to the framework, with the interface to them provided via the OLE-DB.

The framework provides a model of a current shared data context which contains the data that is currently being used by the process. The data is not actually stored within the framework—rather the framework maintain a set of objects which can have arbitrary properties. These objects will be linked into some hierarchy that reflects the DICOM object model (this will be created by the component that provides data selection services). A property on each object will be used to store a reference to the data source (likely a OLE-DB source with an associated row identifier). Activities will also use the properties to store information that should be shared across activities—e.g., the external handles of rasters in the preserver which have copies of the pixel data associated with those objects. The framework will support the notification of changes to the properties.

Other services associated with the shared data will be provided via OLE-DB (e.g., caching, transactions, notification of changes to the data, etc). Activities can make use of these services directly.

Although activities see only a single shared data context, the framework can maintain multiple contexts, each part of a different process instance (and hence with a different set of activities and tools). This support is hidden from the individual activities and tools.

The model is based on a shared data context, which contains the current data sets rather than the data flow model. However, this can be mapped to a model where data flows from one activity to the next. This can be achieved by having the results of one activity placed into the current data context (not replacing the input to that activity). For example, if an activity takes a data set and filters it, the output could be a new data set, which would simply appear in the current shared data context as such. Of course the results need not be explicitly stored, nor even explicitly reside in the framework—the information added to the shared data context could simply be the handles to the generated rasters (in the preserver).

The arm of a process is to embed in the system the logic that guides the user from one activity to the next. Thus each activity performs some tasks (generally based on user input), and then makes some changes to the shared data. It also generates one or more attributes that can be used for control flow (this is separate from the shared data context). The framework examines these control attributes whenever they are changed to determine if they indicate that another activity is to be run. This determination is made by some programmable logic which examines these control variables. As mentioned earlier, this could be implemented in the framework, or perhaps even externally (e.g., in a work-flow engine).

User control of flow is provided. The default behavior is for activities to be sequenced by the pre-programmed logic, but in some cases it is useful for the user to be able to jump back and forth between activities in the process. This is achieved using the navigation UI provided in the sub-process area of the user interface. However it is possible that not all activities in a process may be runnable at any given time (e.g., some might need additional information that would normally be generated by skipped activities). The framework will have to handle this by precluding such transitions, or by putting the selected activity into an active, but inoperable, state.

Figure 5A:
FIG. 5(*a*) is a further embodiment of a UI.

Referring to FIGS. 5(a) and (b) a viewing and reading application implementation is shown. In this configuration the product is hosted by a web browser. At the simplest level, the functionality could simply be a 2D viewer, with the series to view specified separately (e.g., using a form or some other control embedded in a web page). The input then is a specification for a data-set to view, and the location of the DICOM server from which the data are to be obtained.

The imaging part of the page would simply be a rectangular region. The designer would achieve this using a simple 2D viewing component without the remainder of the Framework. In this case there will not be a shared tools area, and the normal Framework services (like shared data and navigation) will not be available (but they are not needed in this case). The important point is that this single component (the 2D viewer) is the same component that can work with the Framework. In this case where the Framework is not present, it will sense that, and so not rely on those services. The container (e.g., a script) will have to supply the appropriate information and user input to control the behavior of the activity.

Figure 5B:
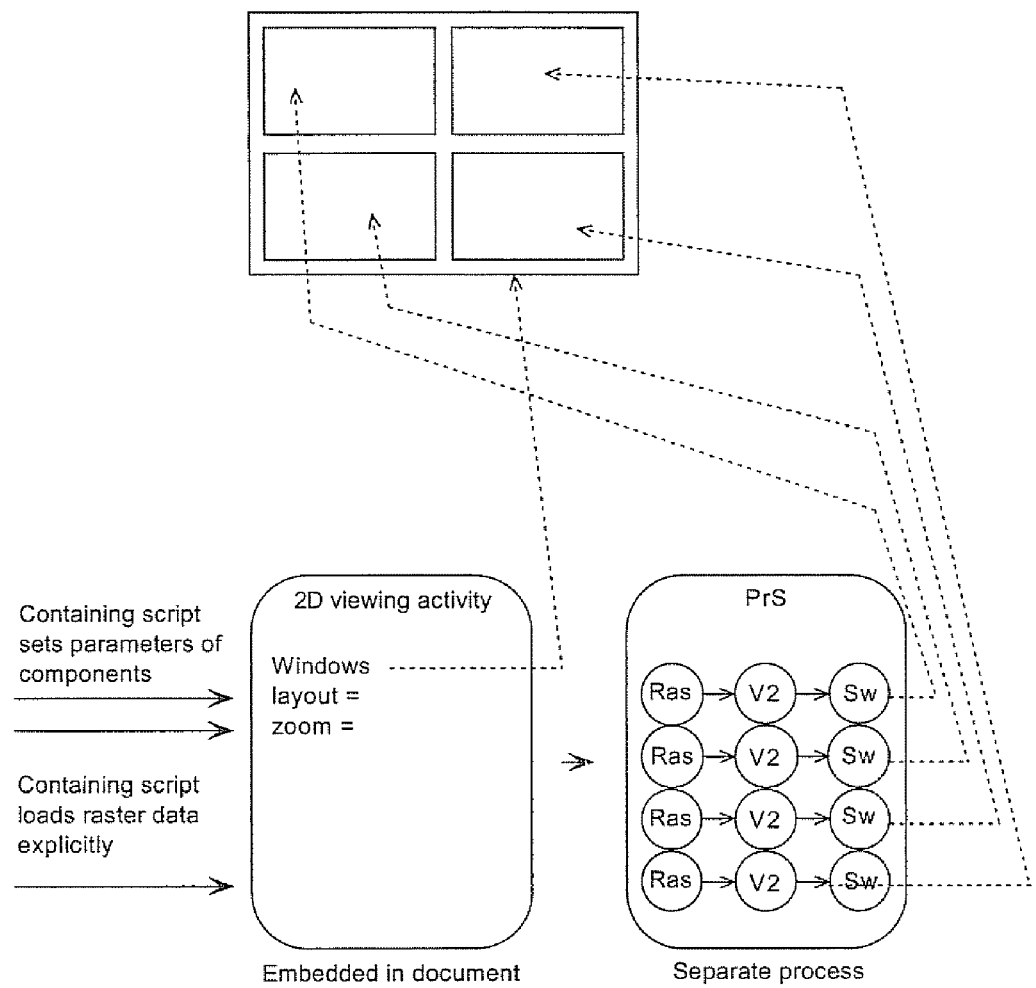

Thus the piece of the architecture used by this application is a 2D viewing component. This control will display a layout in the work area. It will be provided the input data-set explicitly though appropriate APIs. It will setup the appropriate PrS pipelines, and allow control of layout, zoom/par., W/L, etc. Any control of its behavior could be provided externally (e.g. from other controls displayed on the web page, with the wrapper script setting attributes which define its behavior). In FIG. 5(b) the diagram shows how the activity (the 2D viewing component) will operate behind the scenes, in order to support this application.

In a hypothetical product scenario a user of the Framework may want to perform the following sequence of actions:

Select Series
Call 2D Viewer
Define an ROI and save it
Arrange images
Hardcopy
Steps Involved The steps involved and actions resulting are:

Framework instantiated from a host/form (e.g. VB or a web browser). The initial configuration is based on parameters stored in a local database. The following information would be extracted from the database at startup:

Candidate process definitions
Navigation components
Selection components
Tool components
UI configuration
Process definitions The configuration database would also know about configuration issues for individual components.

Patient Selection shows up (takes over space)
Selector queries DB using OLE-DB and gets patient list
Select patient
Patient selected—gets DB name/handle from shared data context
User makes selection. This results in the selector creating a context (one patient). A patient object is created which stores, for example, an associated OLE-DB handle as a property of this object.
User selects Series/Images. The images are listed in the context, however, they are "empty" image objects at this point.
Somehow, process is selected. This could be explicit, or implicit.
Now the navigation area is instantiated.

The first activity is started (e.g. 2D viewer). The activity takes over the UI area.
Activity (2D viewer) indicates which tools it wants (e.g. slider on right edge)
2D viewer creates default layout and displays images.
2D viewer installs mouse handler
2D viewer asks for tools. For example, W/L class tool, pan and zoom tool, etc.
Framework looks up classes and instantiates classes into tools containers (e.g. by default, use tabs)
User drags zoom tool→tool communicates to framework→framework calls back activity
User selects viewport and drags mouse→activity relays info to framework→framework calls tool, which updates information (e.g. W/L in framework), and framework calls back activity
Define ROI in some context (tool?)→store ROI in context (?)
Arrange images with another tool
HC tool; HC functionality (part of 2D viewer, or separate HC component?)

Figure 6:
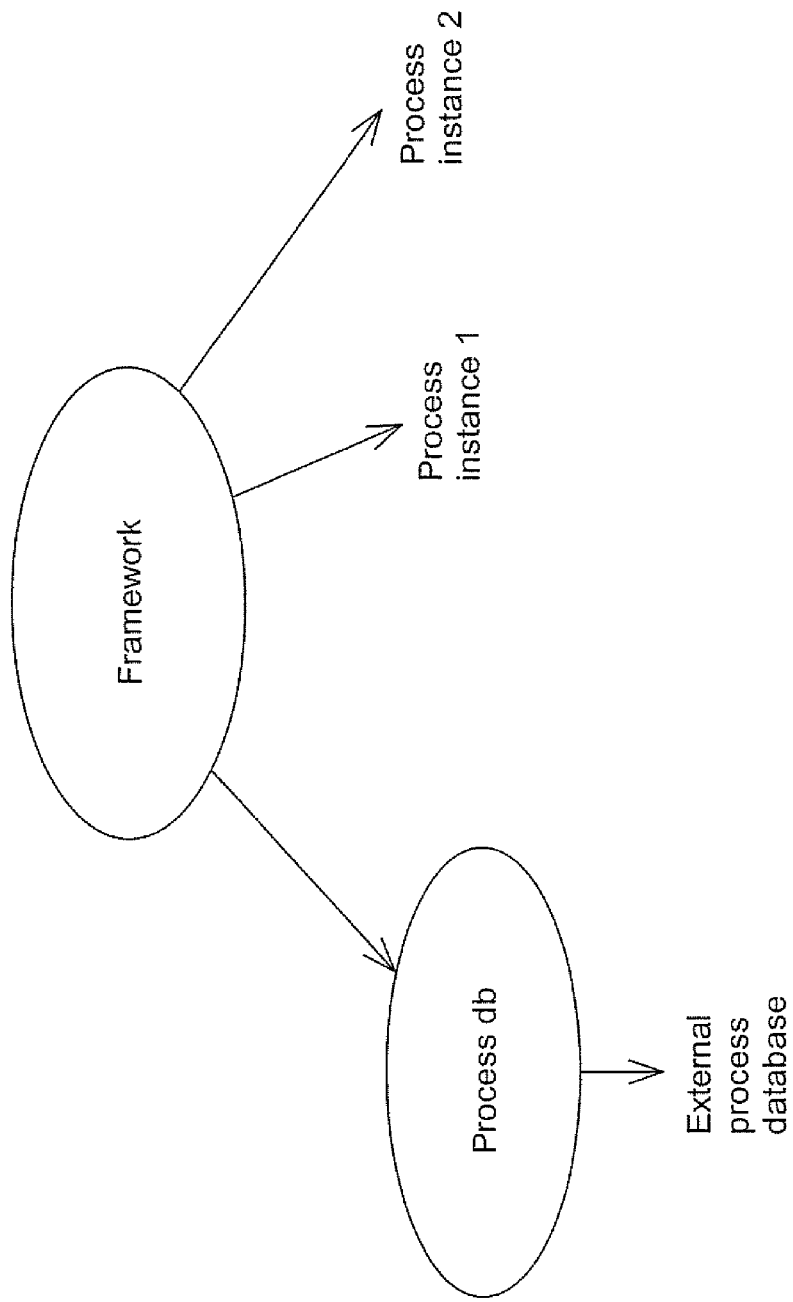
FIG. 6 is a schematic diagram of a framework and the contexts it manages.
Figure 7:
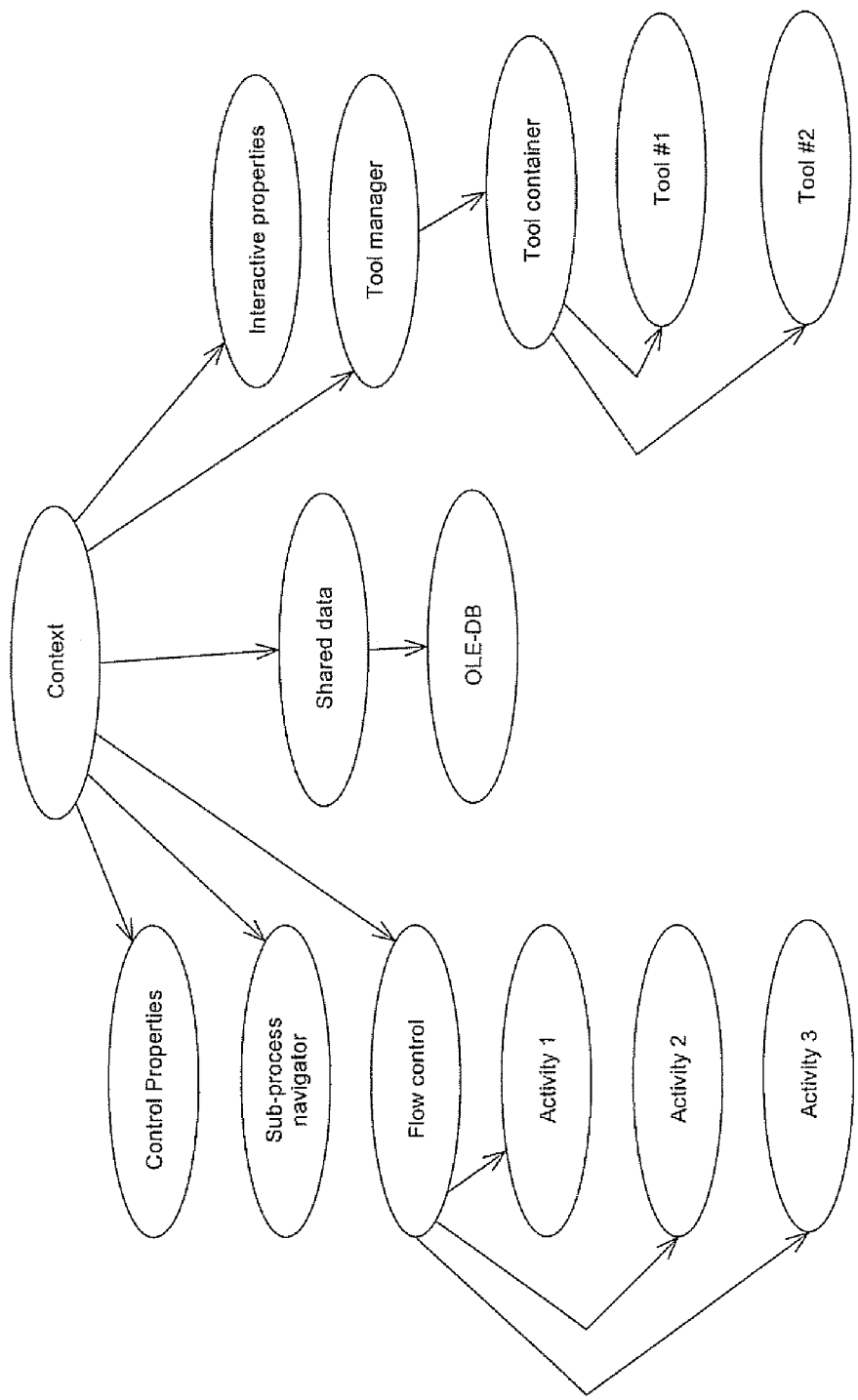
FIG. 7 is an expanded schematic view of a single process instance.

FIGS. 6 and 7 show the objects which are active when there are two process instances (and hence shared data contexts) active. Most of these objects (except the tools and activities components) exist within the Framework component, and so are not directly visible externally (but activities do use the services provided by these objects—as exposed through the activity support interfaces). FIG. 6 represents the highest level—the Framework and the contexts it manages, while FIG. 7 expands the view of a single process instance (context).

Framework component—break-down

Program Database Interface

The database contains a list of named protocols.
For each protocol, there is a list of activities, with specified logic for sequencing.
Each activity is identified by a name, and includes information that allows it to be instantiated (e.g., via a class-id, or URL for the code).
Each activity can also have a set of process-specific properties (properties of the activity class are expected to be handled directly by that component, e.g., using the registry).

Process Instance Manager

The Framework allows the user to work on more than one "task". There can thus be more than one process instance, and each process instance has a manager object. This object manages:
a process (i.e., the sequence of activities)
a control flow manager
a control properties manager
a shared data manager
an interactive properties manager
a shared tools manager Control Flow Manager This object manages the lifetime of the activities in a process. It:
instantiates and destroys the activities
makes each activity active or inactive depending on the navigation
supports automated transition between activities based on the sequence control and the control properties Control Property Manager This object manages sets of properties that are used by the flow control manager to perform automated sequencing. These properties need not be persistent, but it may be necessary to initialize them based on values from the process database. The functions that this object performs thus are:
- set the value of an arbitrary property
- notify the flow control manager on changes to a property Interactive Property Manager This object manages sets of properties that are the means for communication between the tools and each activity. The Framework maintains the mapping between a tool instance and an activity, so that the same tool class can be used by more than one activity in a process.

Both the tools and the activities can get and set these properties, and can be notified of their changes.

Shared Data Manager

This object:
- manages a set of (arbitrary) objects. These objects are the mechanism for passing data between activities.
- allows the set and get of arbitrary properties on these objects.
- properties values have types: string, int, float, etc.
- properties also have a "callback" modifier, whereby an object can register as a provider of some value, and is then called whenever that value is requested. This mechanism allows deferral of tasks that might be expensive.
- provides events to components that have registered an interest in that property of an object.
- Forwards requests to the registered provider when made to a property of an object which has a callback modifier.

Tool Manager

Like the "program database", this module has an interface to the database which includes the mapping of tool names to ActiveX controls that implement those tools. This object also manages the life-time of the tools—it inserts them into the "tool container" (which is a configurable UI component), based on the preferences of the current activity.

UI Manager

This object manages the full user interface area, which is divided into 4 sub-regions—the work area, and the 3 control areas. There needs to be some configurability at this level—e.g., the relative sizes and positioning of these areas. The design should also consider allowing user interaction to move the regions (e.g., "dock-able" regions, as used by Visual Studio).

1.1.1.1 Process Area

The registered process navigator will be instantiated within this area.

1.1.1.2 Activity Navigator

The registered sub-process navigator will be instantiated within this area.

1.1.1.3 Common Tools Area

The registered tool container will be instantiated within this area.

1.1.1.4 Work Area

The current activity (ActiveX control) is installed here.

Activity Support Interfaces

These interfaces are provided to the writers of activities. The notation used here does not imply a specific design—the names used should be interpreted as tags to identify the required functionality.

Configuration

This facility provides configuration information that is specific to this protocol—i.e., properties that are associated with this instance of the activity in this process definition. Class properties are expected to be handled directly by the component (e.g., using the registry).

| | |
|---|---|
| Save persistent properties of the activity | FwPPSave |
| recover persistent properties of the activity | FwPPStore |

Shared Data

This functionality is needed for handling shared data which is in the "current shared data context"—i.e., the shared data context associated with the process instance in which the activity is running.

| | |
|---|---|
| create object | FwSDObjCreate |
| delete object | FwSDObjDelete |
| locate object | FwSDObjLocate |
| release handle reference count | FwSDObjRelease |
| link objects | FwSDObjLink |
| unlink objects | FwSDObjUnlink |
| traverse object tree | FwSDObjTraverse |
| set property on object | FwSDObjPropSet |
| get property from an object | FwSDObjPropGet |
| register for notification of change of an object property | FwSDObjPropRegister |
| register as the provider of the value of an object property | FwSDObjPropProvide |

Tools

| | |
|---|---|
| register interest in a tool class | FwToolNeed |
| register interest in changes to tool properties (Interactive property manager) | FwToolPropRegister |

Control

| | |
|---|---|
| set a property in the control context | FwCtrlPropSet |

Utility

| | |
|---|---|
| determine if the component is being run with a supporting Framework | FwIsFramework |

Tool Support Interfaces

These interfaces are intended for the writer of a tool component:

| | |
|---|---|
| Set an output property | FwToolPropSet |
| Get an output property | FwToolPropGet |
| register for notification of changes to an input property | FwToolPropRegister |

Process Navigator Support Interfaces

The process navigator needs to provide a UI for switching between process instances, creating and destroying a process instance, and for selecting data and a process to run. It also needs to display some status information (like the current patient), and so will use the "Shared Data" interfaces and OLE-DB for those purposes.

Process Instance Management

| | |
|---|---|
| Create a context | FwCtxtCreate |
| destroy a context | FwCtxtDestroy |
| set context as current (this will trigger activities like switching of the current instances with the new ones for the UI areas: sub-process, tools, and work-area). | FwCtxtActive |
| interact with the current context (as above "Shared data context"). | FwCtxtList FwCtxtObjLocate FwCtxtObjRelease FwCtxtObjPropGet |
| Locate data selector and instantiate it. | |

Process Definition Support Interfaces

| | |
|---|---|
| determine location of definition library (bootstrap from registry) and open it | FwLibOpen |
| close library | FwLibClose |
| list stored routines | FwLibProcessList |
| recover properties of a routine | FwLibProcessGet |
| pass selected process to control manager | FwCtrlStart |

Sub-process Navigator Support Interfaces

| | |
|---|---|
| obtain list of activities in current process with a graph of execution control | FwCtrlActList |
| determine current activity | FwCtrlActNow |
| switch current activity to another in the process | FwActSwitch |
| get notification of changes - i.e., when the Framework has switched activities. | FwCtrlRegister |

A Process Control Component

This component is an example that can be used in a demo to show the process navigation capabilities. It should:

| | |
|---|---|
| display information about the current context (e.g., patient and process) | FwSDObjPropGet |
| allow switching between contexts, if there are more than one active. | FwCtxtList FwCtxtActive |
| Allow the creation of a new context with a configurable data selector | FwCtxtCreate FwSDObjCreate FwSDObjPropSet |

A Data Selector Component

This component will use OLE-DB directly for the browsing of the data sources and for traversing the hierarchy of patient/study/series.

This component will also use the interfaces defined for "Process definition" (above).

| | |
|---|---|
| The selected data-set will be specified by creating the appropriate objects in the current shared data context (the "Shared Data" APIs listed above). | FwSDObjCreate FwSDObjPropSet |

A Sub-process Navigator Component

This component is an example that can be used in a demo to show the sub-process navigation capabilities. It should:

| | |
|---|---|
| Display information about the current activity (e.g., its name) | FwCtrlActNow |
| Provide a UI to allow selection of other activities in the current process. | FwCtrlActList FwCtrlActSwitch FwCtrlActRegister |

A Tool Container

This component is simple a container for a set of tools. It may be that an existing ActiveX component can be used directly (e.g., a tab-card controller would be useful for the demo).

2D Viewer—an activity

This component is an "activity"—it will thus use the activity support interfaces that are listed above. When this component is active, it will have ownership of the work area. When it is created, it will:

| | |
|---|---|
| register interest in a set of tools | FwToolNeed |
| set mappings between a set of properties it defines in the shared data context, and output values from the tools. | FwToolPropSet FwToolPropRegister |
| express interest in changes to the properties it is using for tools control. | FwSDObjPropRegister |
| set its class-specific default properties (e.g., recover from the registry) | |
| recover instance-specific configuration (via the Framework) | FwPPGet |

When the activity first becomes active, it will:

| | |
|---|---|
| locate the current data-set in the shared data context | FwSDObjLocate FwSDObjPropGet | locate the data source—e.g., the series and the OLE-DB provider, with the row handles for each image to be displayed.

setup the appropriate UI (e.g., layout).

connect to the preserver, and determine if it needs to load data from the data source (this would not be needed if the data were already loaded—which is indicated by the raster handles stored on the appropriate objects in the shared data context).

The component should respond to new input—user interaction in the work area, or input from the tools:

based on the layout and user actions, and the current loaded status, request data to be loaded (via OLE-DB).

perform the requested operations (e.g., zoom, pan layout change, etc).

When the activity is being destroyed, it should:

| | |
|---|---|
| request that the framework save any instance-specific parameters that need to be preserved across runs (and are specific to this process definition). | FwPPStore FwSDObjRelease |

A tool—2D zoom/pan control

This component will provide a simple UI to allow the user to set zoom and pan. On creation it should:

| | |
|---|---|
| create the UI | |
| recover the default values for the control from the interactive (tool) property manager (those values are in turn mapped from the setting owned by the activity, which may have set default values when it was created). | FwToolPropGet |
| Register for notification of changes to those properties. | FwToolPropRegister |
| If this control is also going to respond to mouse events in the work area, it should register for notification of changes to those also (again achieved via a property). | |
| set the UI elements to the default values | |

When the user changes a UI element, it should:
set the corresponding property in the interactive property manager (which will subsequently result in notification to the activity of the properties it owns).

When the activity itself changes a property watched by the tool, the tool should:
update its UI to reflect the new settings.

A tool—Window Width and Level Control

This is basically the same as the above example, except that the UI and properties will be different.

Figure 8:
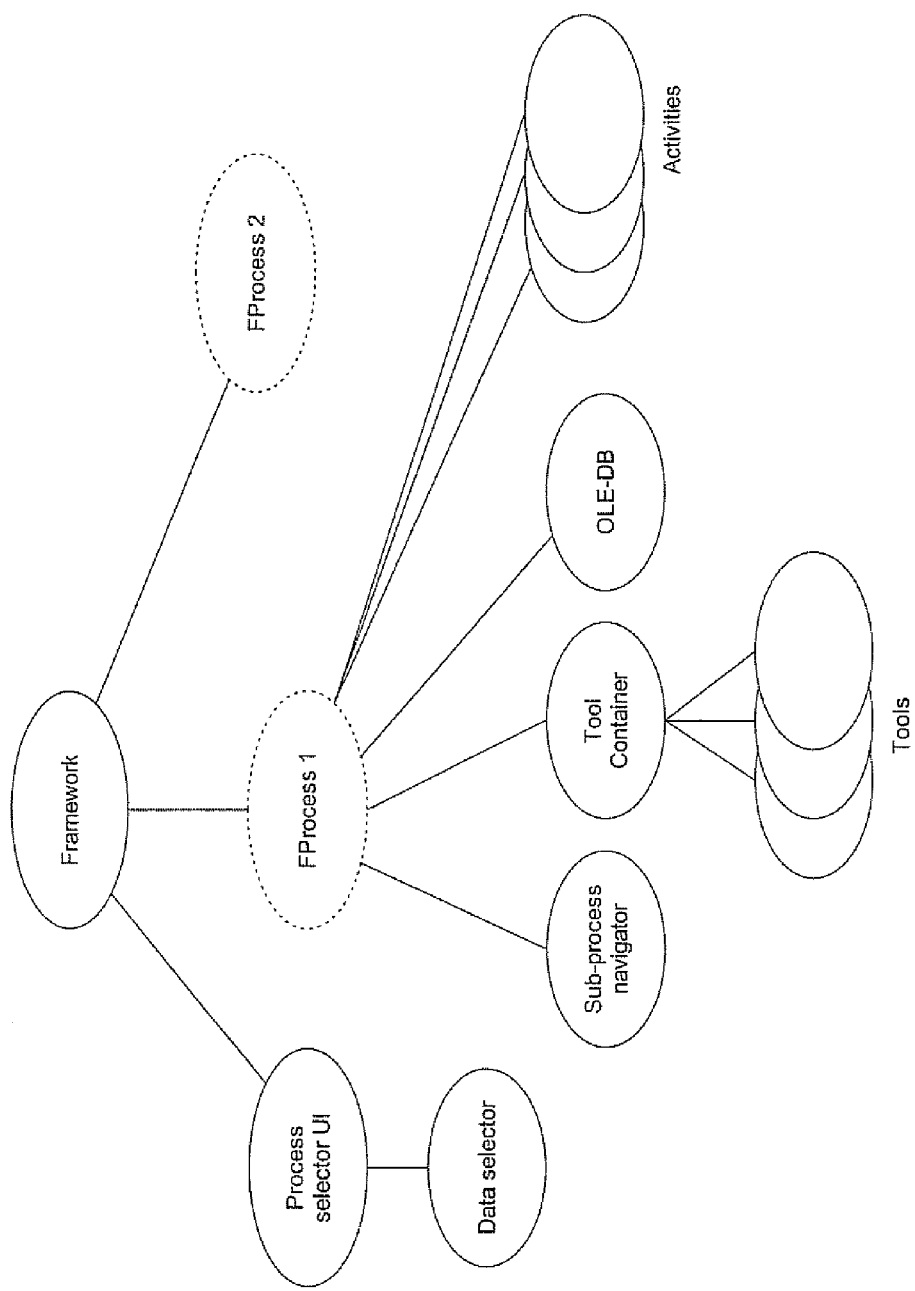
FIG. 8 is a further schematic diagram showing system components.

FIG. 8 is a further example of an overview of the components that may be instantiated during some scenario. At the top level, there is an ActiveX control called "Framework". This control is also a container, and it manages the division of the UI amongst the controls it contains. In addition to partitioning the UI, this container creates and manages some controls. The UI configuration and the identity of the controls is obtained from the registry, and then from the process database (the definitions of the processes are contained there).

The component labeled "process selector UI" is identified in the configuration, and is created and displayed in the UI once the Framework starts. It in turn can display a configurable "data selector" control, which allow selection of data set(s) to use, and the process template to associate with it.

The Framework supports multiple process instances (or contexts), and this is indicated in the above diagram by a component labeled "FProcess 1", and another labeled "FProcess 2". This object is actually part of the Framework (it will be delivered within the same d11). However it may be more convenient to keep this as a separate control, even though it is not expected that it will be used without the Framework container. [This is still to be determined—the current plan is to implement this as a class used internally within the Framework, but if it looks like it will be easier to manage the separate processes as separate COM objects, then this object will be implemented that way (but still delivered as part of the same d11).]

The FProcess is itself a container. It is concerned with a single process definition, and has an associated data context. The creation of a FProcess requires the provision of a process template, as well as the information required to identify the data—e.g., definitions of the data objects to be shared (this is handled inside the FProcess, and so not represented directly in the diagram).

An FProcess instance manages 3 of the UI areas (sub-process navigator, tools area, and work area). The sub-process area is populated by a control—which is again configurable. The identity of this class will be recovered by the Framework, and made available to FProcess.

Similarly the "tool manager" component is configurable, and its identity will be recovered and made available to the FProcess by the Framework. FProcess will manage the controls which represent the "tools", and the controls which are the "activities". The identities of these are contained in the process template, which is provided to the FProcess component when it is initiated.

Figure 9:
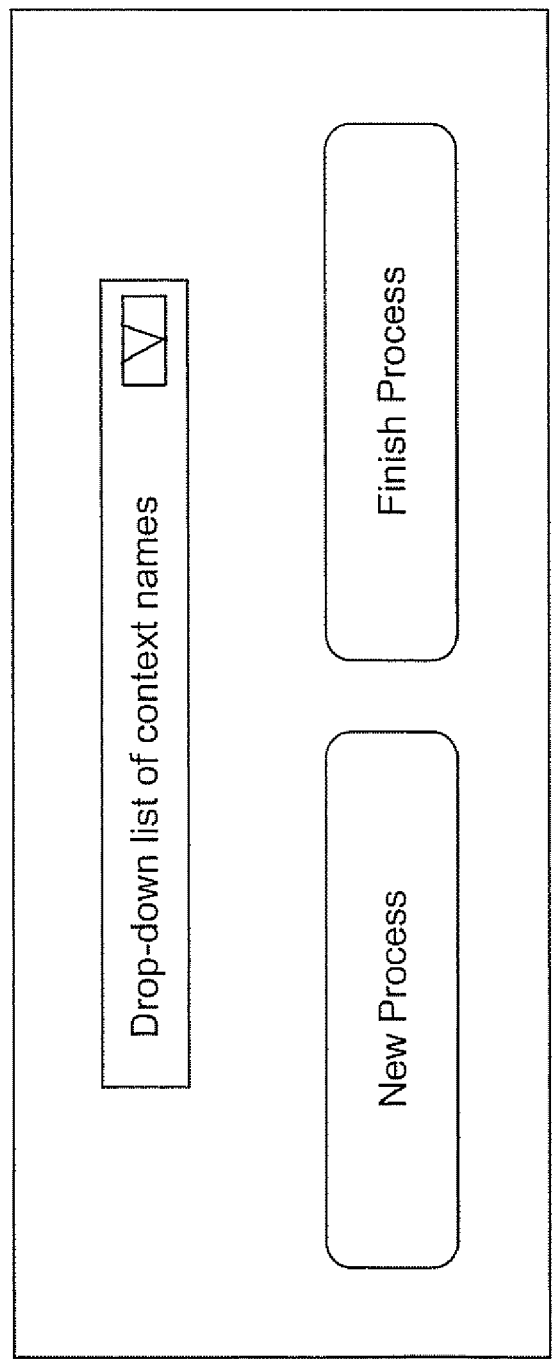
FIG. 9 is a schematic diagram of a process navigator UI.
Figure 10:
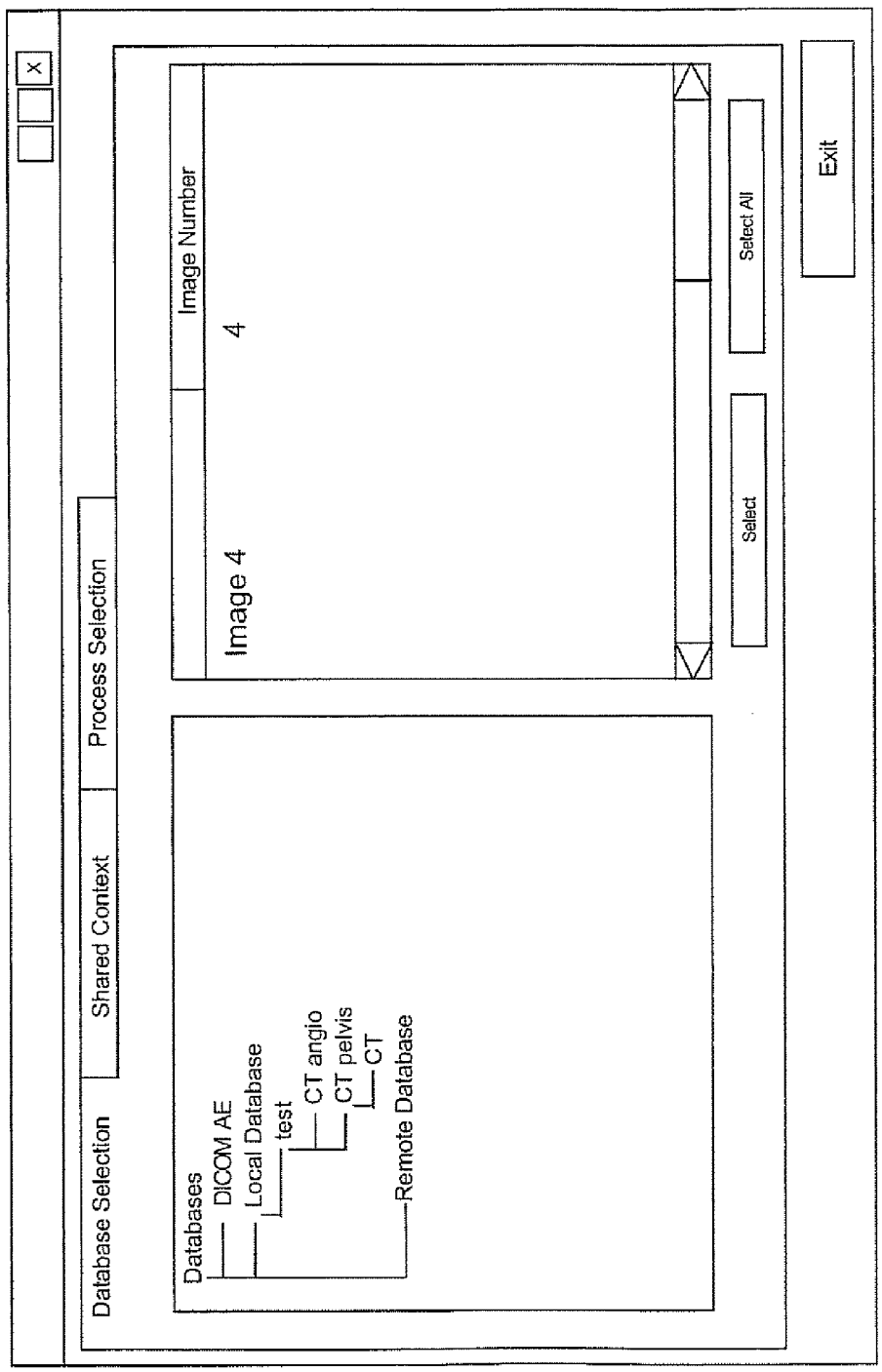
FIGS. 10, 11 and 12 are schematic diagrams of a database selection and related views.

The process selection area can be populated by this control (as configured). Its task is to allow the selection between active tasks, and the creation or new processes. It can have quite a simple UI as shown in FIG. 9 where the "new process" push-button results in the use of another control—one from the class of "data selectors". This control is also configurable, and its role is to provide a user interface for the selection of a process template and a data-set (or data-sets) for subsequent use by activities in the Framework. The "finish process" button stops the currently active process (the current process is the one displayed in the drop-down list box).

The following describes an example data selector. This configurable control is instantiated by the "process selector" (above), and it is responsible for determining the data and process to use. Typically this would be achieved by allowing the user to select a data-set (or multiple data-sets), and then a process (protocol) to use with this data. However different models can also be used—e.g., the process may need to be selected first, with that determining the sub-set of possible data-sets that can be chosen. Another model is one where the data-set is determined externally (e.g., in an enterprise work-flow engine), with even the process (protocol) pre-determined. In this case the selector need only present a list of possible work items to the user (selection of one implies a data-set and a process to use).

In general, there are different selection mechanisms that may need to be supported, depending on the process (protocol). For example:
single image selection •single series (for 3D, MPR, etc.)
    •two series (for Fusion)
multiple series, single Study or Patient (review, reading)
    •arbitrary selection The example data selector will be rely on the assumption that data is stored in the conventional Patient-Study-Series-Image hierarchy, and it will allow arbitrary selection of images and processes independent of each other. In addition, it will show those Patient, Study, Series and Image objects that are currently represented in the shared data context, for demonstration purposes.

The User Interface will be organized in the form of tab cards, with three different views.

The first view, on the tab "Database Selection" displays a hierarchical view of the Database-Patient-Study-Series-Image hierarchy on the left side of the control, and the list of images of the current Series in a list on the right side of the control. Two buttons allow the user to select either a subset of the listed images, or all of them.

Figure 11:
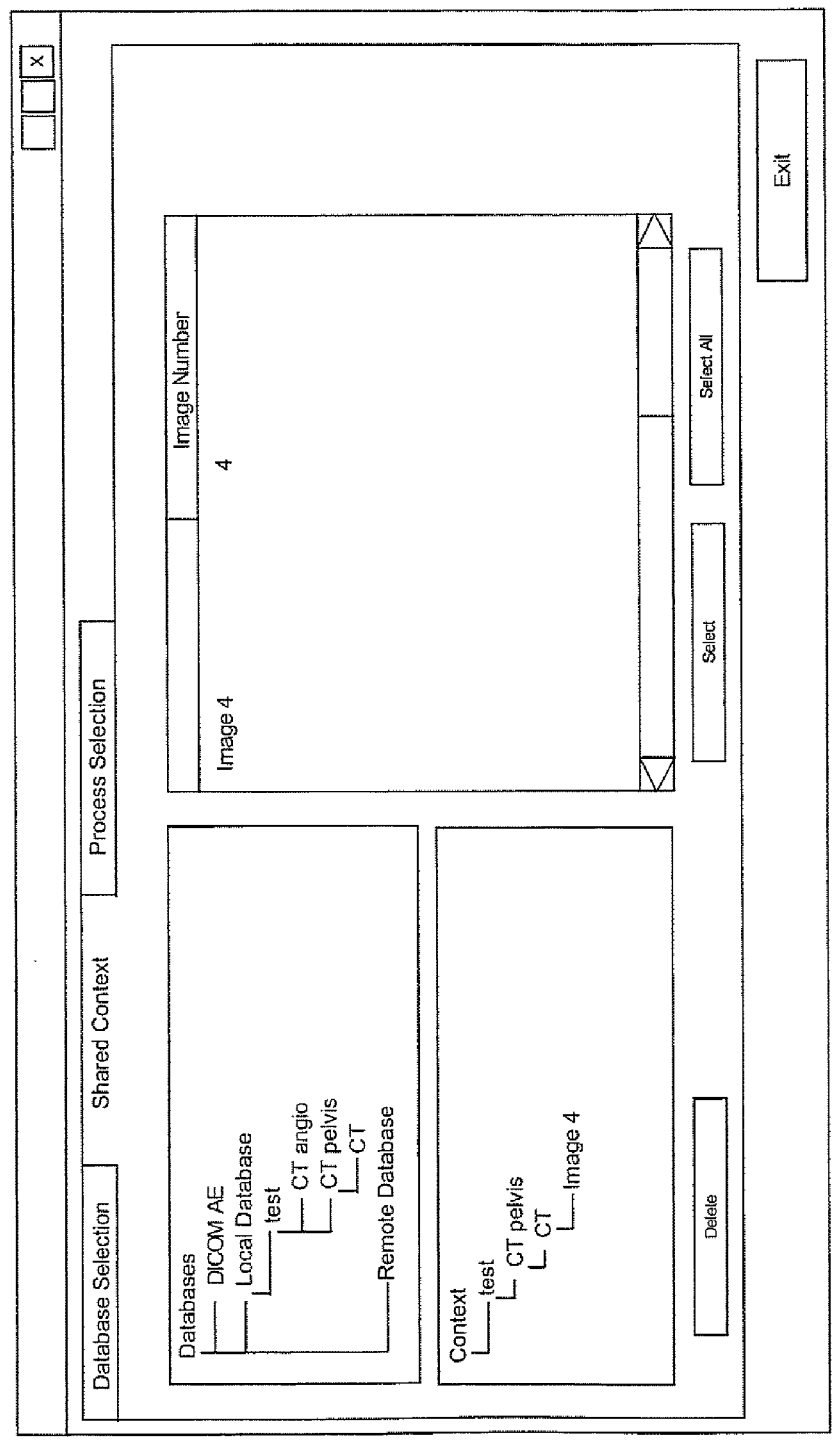

The second view shown in FIG. 11, on the tab "Shared Context" is similar, but it shows the current contents of the shared data context as well.

Figure 12:
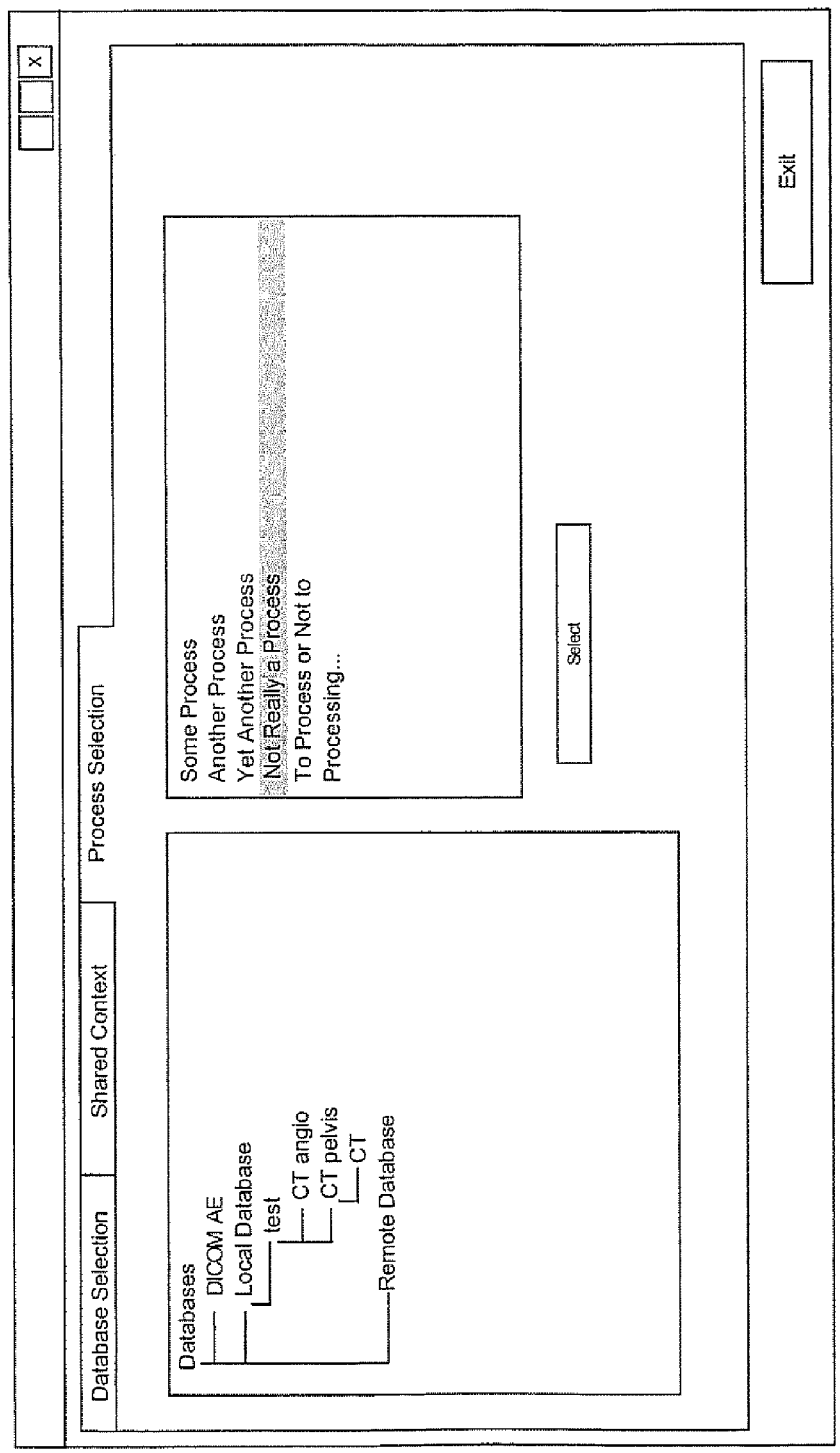

The third view shown in FIG. 12 also repeats the hierarchical view of the database. It provides a simple list and button for selection of the desired process (protocol). The example data selector will be implemented in Viscal Basic. There are two advantages to this: firstly, a large portion of this control will be user interface, and Visual Basic allows very fast and convenient creation of user interfaces; secondly, it is not unlikely that customer will want to create activity components in Visual Basic—it is therefor useful to accumulate some experience with it.

The user scenario will be quite simple:
1. The user will first be presented with the Database Selection tab. The user will navigate down the database hierarchy and select one or more images from one or more series and patients. 2. The user will then select the Shared Context tab, the verify that the shared context contains exactly the data that are required. 3. The user will select the Process Selection tab to select the protocol to be executed for the data.

Some logic may be implemented to force the selection of at least one image and at least one process.

In terms of interactions with other components of the system, the example data selector will interface with
The database; the available databases will be loaded from the system registry, and accessed through ADO
The shared context; objects and properties will have to be retrieved from and created in the shared context
The process database; available process have to be retrieved
The selection area; this is the container for the data selector, and it needs to be notified of the selected process The data selector is an ActiveX control with some design time behavior (the tab selector will be active, and the various lists and buttons will move and size with the control).

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A computer implemented framework for monitoring workflow within a computer application, said workflow including coordination of at least one activity from a set of activities originating from outside said application, said framework having multiple levels of functionality and capable of coordinating a plurality of said activities for said workflow from different sources outside said application for use in said application, said framework comprising:
   (a) a user interface for facilitating interaction between a user and said application;
   (b) a process level for selecting a process definition defining a set of process steps to be applied to a data set during said workflow according to the coordination of said activities whereby said process steps are associated with said set of activities, said process level comprising a process selector for selecting said process definition from a group of at least one process definition and a data selector for selecting said data set from a group of at least one data set, each said groups being stored in a data storage device accessible by said application;
   (c) a sub-process level including an aggregation of selected activities from said set of activities, said aggregation of activities associated with said process definition, said sub-process level enabling navigation between ones of said selected activities during execution of said process definition for monitoring said workflow; and
   (d) an activity level including said at least one activity from said set of activities, said at least one activity having a property that is modified as a result of the execution of said process definition during said workflow, whereby each said at least one activity is applied to said data set during its respective process step in said set of process steps to produce an output data set for subsequent use.

2. A framework according to claim 1, wherein the levels are assignable to distinct regions of said user interface.

3. A framework according to claim 2, wherein said activity level further supports re-use of a previous activity over a current activity, said activity selected from said aggregation of selected activities.

4. A framework according to claim 2, wherein said user interface facilitates multiple activities that are processable concurrently.

5. A framework according to claim 1, wherein said user interface includes a screen for providing a display of images.

6. A framework according to claim 5, wherein a current activity being processed from said set of activities is assigned to a work area of said screen, said work area having a substantial portion of the screen surface area.

7. A framework according to claim 6, wherein said framework monitors ownership of said work area by said current activity.

8. A framework according to claim 6, wherein a content of said work area contains shared properties stored in a shared data context.

9. A framework according to claim 8, wherein said shared data context is accessible by cooperating ones of said selected activities for sharing information.

10. A framework according to claim 8, wherein said data set and said set of process steps form a basis of said shared data context.

11. A framework according to claim 8, wherein the content of said shared data context accessible by said user is for verifying that required data for said selected activities is present.

12. A framework according to claim 1, wherein said sub-process level facilitates a dynamic ordering of said selected activities by said user.

13. A framework according to claim 1, wherein said process level automates a control flow between said selected activities in said set of activities based on a rule set or an activity property set.

14. A framework according to claim 1, wherein at least two of said different sources have different formats.

15. A framework according to claim 1, wherein said process level monitors functionality of a current activity based on said output data set obtained from a previous activity.

16. A framework according to claim 1, wherein said process level facilitates selection between active activities by a user.

17. A framework according to claim 1 further comprising a tool level for setting a parameter of said activity level, said parameter for updating an operational behavior of said activity level.

18. A framework according to claim 17, wherein said tool level is assignable to a distinct region of said user interface.

19. A framework according to claim 18, wherein said framework coordinates installation of a tool in the tool level region of said interface, said tool requested by said activity level.

20. A framework according to claim 17, wherein said tool level includes a tool navigator for facilitating selection of a tool by said user.

21. A framework according to claim 17, wherein multiple tool levels are supported by said framework.

22. A framework according to claim 17, wherein said framework restricts access by said user of selected ones of the levels.

23. A framework according to claim 1, wherein said framework restricts access by said user of selected ones of the levels.

24. A framework according to claim 1 further including a module for interfacing said application to a data base library.

25. A framework according to claim 24, wherein said database library includes data selected from the group comprising process definitions, sub-process descriptions, and activity information.

26. A framework according to claim 24, wherein said data set is external to said framework with an interface to said data set provided by said module.

27. A computer implemented method of monitoring a workflow within an application of a computer implemented framework, said workflow including coordination of at least one activity from a set of activities originating from outside said application, said framework having multiple levels of functionality and capable of coordinating a plurality of said activities for said workflow, and having a user interface for facilitating interaction between a user and said application, said application having said set of activities at an activity level, said activities selectable from a plurality of different sources, the method comprising the steps of:
  (a) at a process level, selecting a process definition from a data storage device, said process definition defining a set of process steps for processing a data set during said workflow according to the coordination of said activities whereby said process steps are associated with said set of activities;
  (b) selecting said data set from said data storage device;
  (c) initiating said application for combining a plurality of said activities from different sources outside said application according to said process definition;
  (d) at a sub-process level, navigating between ones of activities selected from said set of activities according to said process definition to enable said workflow to be monitored; and
  (e) executing said process definition to apply each said at least one activity to said data set during its respective process step in said set of process steps thereby modifying at least one property contained in said data set for producing an output data set for subsequent use.

28. A method according to claim 27 further comprising the step of assigning at least some of said multiple levels of functionality to distinct regions of said user interface.

29. A method according to claim 28, wherein said user interface includes a screen providing a display of images.

30. A method according to claim 29 further comprising the step of assigning a current activity selected from said set of activities to a work area of said screen, said work area having a substantial portion of the screen surface area.

31. A method according to claim 30 further comprising the step of monitoring ownership of said work area by said current activity.

32. A method according to claim 28 further comprising the step of processing at least two process definitions concurrently.

33. A method according to claim 32 further comprising the step of selecting between active activities for assignment to a work area of said user interface.

34. A method according to claim 33, wherein said application supports a reuse of a previous activity over a current activity, said previous activity selected from said set of activities.

35. A method according to claim 28 further comprising the step of monitoring a level of information displayed in said distinct regions of said user interface.

36. A method according to claim 28 comprising the step of managing said distinct regions of said user interface by a current activity.

37. A method according to claim 27 further comprising the step of dynamically monitoring of an execution order of said set of activities by a user of said application.

38. A method according to claim 37 further comprising the step of automating a control flow between selected activities in said set of activities based on a rule set or an activity property set.

39. A method according to claim 27 further comprising the step of monitoring an operational functionality of said set of activities based on said output data set obtained from a previous activity.

40. A method according to claim 27 further comprising the step of setting a parameter of said set of activities by a tool, said parameter for updating an operational behavior of said set of activities.

41. A method according to claim 40 further comprising the step of assigning said tool to a distinct region of said user interface.

42. A method according to claim 41 further comprising the step of installing a tool in the tool region of said user interface, said tool requested by said process definition.

43. A method according to claim 27 further comprising the step of sharing properties of a content of a work area of said user interface in a shared data context.

44. A method according to claim 43 further comprising the step of accessing said shared data context by cooperating ones of said set of activities for sharing information purposes.

* * * * *